United States Patent [19]
Davis

[11] Patent Number: 4,801,789
[45] Date of Patent: Jan. 31, 1989

[54] REPLACEABLE READER HEAD FOR OPTICAL CODE READER

[75] Inventor: Paul R. Davis, Corvallis, Oreg.

[73] Assignee: Videx, Inc., Corvallis, Oreg.

[21] Appl. No.: 882,729

[22] Filed: Jul. 7, 1986

[51] Int. Cl.⁴ .............................................. G06K 7/10
[52] U.S. Cl. .................................. 235/472; 235/473; 235/462; 250/566
[58] Field of Search ...................... 235/473, 472, 462; 250/566, 552, 227

[56] References Cited

U.S. PATENT DOCUMENTS

| | | | |
|---|---|---|---|
| 3,904,277 | 9/1975 | Phillips et al. | 235/473 X |
| 3,953,730 | 4/1976 | Henry et al. | 250/227 |
| 3,999,062 | 12/1976 | Demsky et al. | 250/227 |
| 4,283,622 | 8/1981 | Passer et al. | 235/473 X |
| 4,434,360 | 2/1984 | Woosley et al. | 235/472 |
| 4,644,155 | 2/1987 | Mochizuki et al. | 235/473 X |
| 4,647,766 | 3/1987 | Dimur et al. | 235/472 X |
| 4,666,236 | 5/1987 | Mikami et al. | 250/227 X |
| 4,721,849 | 1/1988 | Davis et al. | 235/472 |

OTHER PUBLICATIONS

Wilmes, "A Reflective Scanner", Xerox Disclosure Journal, vol. 1, No. 8, Aug. 1976.

"Bar Code Read Head", Texas Instruments Incorporated, Apr. 1983.

Primary Examiner—Philip H. Leung
Attorney, Agent, or Firm—Chernoff, Vilhauer, McClung & Stenzel

[57] ABSTRACT

An exceptionally thin, replaceable reader head for an optical code reader has a thin base upon which are mounted both a light source for illuminating the codes in an edgewise direction relative to the base, and a light sensor for receiving light reflected from the codes also in an edgewise direction, the light sensor including an optical fiber for contacting the codes. Detachable electrical connectors for the light source and light sensor, respectively, extend generally in opposite edgewise directions for connection to the electrical circuits of the optical code reader. The base of the reader head contains deformable mounts for fixedly connecting the light source and light sensor to the base, as well as fiber holding structures for holding the optical fiber in a predetermined position relative to the base. In order to reduce the requirement for precise alignment of the optical fiber with the light sensor, the end portion of the optical fiber adjacent the light sensor is of a varying cross-sectional area which increases gradually toward the end.

12 Claims, 1 Drawing Sheet

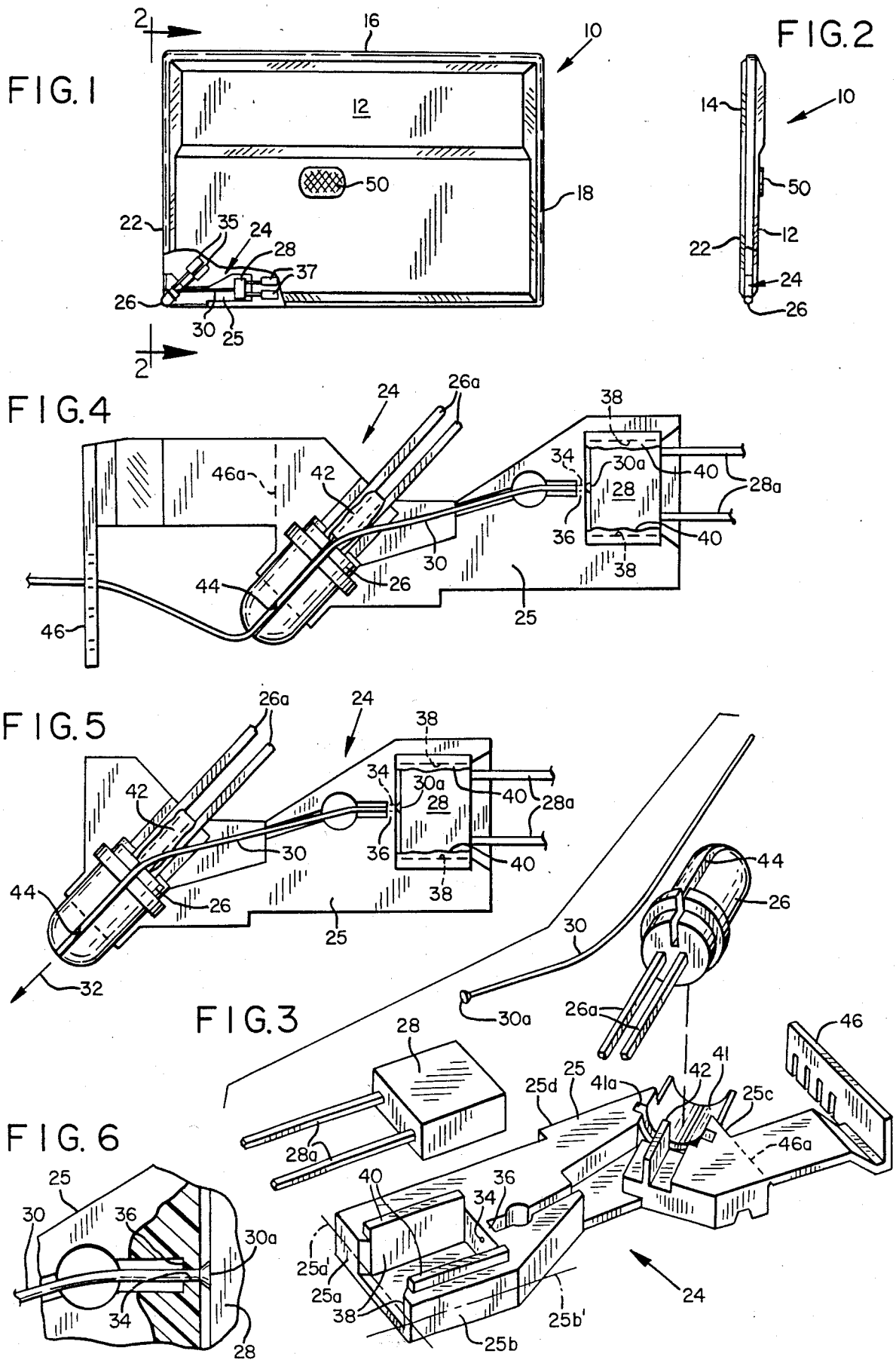

REPLACEABLE READER HEAD FOR OPTICAL CODE READER

BACKGROUND OF THE INVENTION

This invention relates to reader heads for optical code readers, such as bar code readers, and particularly to easily replaceable optical reader heads of relatively inexpensive construction.

It is a common necessity to replace the light source and/or light sensor components of optical code readers due to wear or malfunction. Most such replacement operations require disassembly of the code reader, removal of the element to be replaced, and soldering of the leads of the replacement element to the circuitry of the code reader.

At least one optical reader head has previously been developed which combines the light source and light sensor into a conveniently replaceable module with connectors for attachment to the code reader circuitry. This is the "Type TIL180 Bar-Code Read Head" manufactured by Texas Instruments Inc., of Dallas, Tex., which uses dual optical fibers, one of which transmits light from a light source to illuminate the codes and the other of which transmits reflected light from the codes to a light sensor. A light source designed by the same company is disclosed in Woosley U.S. Pat. No. 4,434,360, and features a light-sensing optical fiber implanted in the transparent body of the light source.

Even such modular reader heads as the TIL180, however, are not sufficiently compact to be usable in optical code readers of the highly portable type currently gaining in popularity. For example, in a copending, commonly-owned patent application of which the inventor herein is a co-inventor, Ser. No. 782,970, filed Oct. 2, 1985, now U.S. Pat. No. 4,721,849 a thin, planar, credit card-shaped optical code reader is disclosed whose shape and size demands a correspondingly thin, planar, easily replaceable reader head.

Other problems of current reader head assemblies include their high fabrication expense, necessitated by such requirements as precise alignment of optical fibers with light sensing phototransistors, and difficulties in positioning the various reader head elements reliably and accurately relative to each other.

SUMMARY OF THE PRESENT INVENTION

The present invention is a unique, replaceable, optical reader head assembly which combines a light source and light sensor on a base in an exceptionally thin, planar configuration. The reader head provides illumination and light sensing in an edgewise direction and features detachable electrical connectors, for the light source and light sensor, extending generally in an opposite edgewise direction for easy replaceability of the reader head assembly.

The cost of fabrication of the replaceable reader head is minimized by several features which facilitate and simplify its manufacture. Although an optical fiber is used to transmit reflected light from the optical codes to the light sensor, the alignment of the end of the optical fiber with the light sensor is greatly facilitated by forming the end portion of the optical fiber adjacent the light sensor with a gradually varying cross section which increases in a direction toward the end of the fiber. This diverges the transmitted light and thereby creates a larger light distribution area on the light sensor, increasing the permissible tolerance for misalignment between the fiber and the sensor. The expanded end portion of the optical fiber is preferably formed by heat deformation. The expanded end contrasts with fiber ends formed by mechanical cutting of the optical fiber (by snipping or otherwise) which tends to crush the end creating an end portion of varying cross section which narrows toward the end. A crushed end portion reduces the light distribution area and has a tendency to transmit the light in the form of isolated spots instead of uniformly over the distribution area, making proper alignment of the end of the optical fiber with the light sensor extremely critical.

An additional advantage of the expanded configuration of the optical fiber end is that it enables light to be accepted at the opposite end of the optical fiber over a wider acceptance angle. This is particularly advantageous in a hand-held, portable code reader where the optical fiber receives reflected light while contacting the codes. The criticality of the angle at which the user holds the code reader is thereby diminished.

Further features of the reader head which contribute to its facility and economy of manufacture include structural features of the base which facilitate mounting of the light source, light sensor, and optical fiber on the base. These include deformable portions of the base which, when deformed, fixedly connect the light source and light sensor respectively to the base, cooperating with depressions in the base to hold the light source and light sensor in proper position until an adhesive can be applied and cured to complete the assembly of the reader head components. Moreover, a portion of the base has an aperture formed therein adjacent the light sensor mounting position for accepting the insertion of the optical fiber throughout a majority of the fiber's length while preventing passage of the expanded end of the fiber. The aperture thereby not only holds the expanded end of the optical fiber in proper position on the base, but prevents longitudinal movement of the expanded end of the fiber thus permitting the light sensor to be pressed forcibly into abutment with the expanded end, creating a superior light-transmitting junction.

The base also includes a detachable fiberholding member for properly positioning the other end of the fiber, i.e., the light-receiving end, until it is permanently affixed by application and curing of an appropriate adhesive. The detachable fiber-holding member is particularly advantageous for the proper positioning of the light-receiving end of an optical fiber intended for contacting the optical codes, since any permanent fiber-holding structure would be likely to interfere with the ability of the fiber to contact the codes. Preferably, in the further interest of economy, the detachable fiber-holding member is connected to the base simply by means of a breakable member.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a plan view of an exemplary optical code reader having an exemplary replaceable reader head in accordance with the present invention mounted therein, with a portion of the code reader broken away to reveal inner structure.

FIG. 2 is an end view of the code reader of FIG. 1, taken along line 2—2 of FIG. 1.

FIG. 3 is an enlarged, exploded, perspective view of the reader head of the present invention shown with the detachable fiber-holding member connected to the base thereof.

FIG. 4 is a plan view of the reader head of FIG. 3 showing interconnection of elements during the manufacture thereof.

FIG. 5 is a plan view of the reader head in finished form after manufacture has been completed, with the detachable fiber-holding member removed from the base and the optical fiber cut flush with the tip of the light source.

FIG. 6 is an enlarged, partially sectional detail view of the junction between the optical fiber and light sensor of the reader head.

DESCRIPTION OF THE PREFERRED EMBODIMENT

FIGS. 1 and 2 show a highly portable, hand-held optical code reader, designated generally as 10, comprising a thin, generally planar housing consisting of front and rear cover plates 12 and 14 separated by multiple elongate edges 16, 18, 20 and 22. A replaceable optical code reader head, designated generally as 24, is located at one of the corners of the code reader between the plates 12 and 14 and includes a base 25, preferably constructed of plastic material, upon which is mounted a light source in the form of an LED 26, a light sensor in the form of a phototransistor 28, and an optical fiber 30.

With reference to FIG. 3, the base 25 has a peripheral elongate edge surface comprising edge portions 25a, 25b, 25c, 25d, etc. extending longitudinally along the periphery of the base in different directions which define an imaginery common plane exemplified by phantom lines 25a' and 25b'. In FIG. 5, showing the replaceable reader head in finished, assembled form, such imaginary plane is the plane of the paper. The light source LED 26 is mounted on the base 25 in communication with a location on the peripheral edge surface of the base such that it protrudes outwardly from the edge surface and directs light in an illuminating direction extending substantially parallel to the aforementioned imaginary plane and outwardly from the edge surface, as indicated generally by the direction of the arrow 32 in FIG. 5, so as to illuminate an area immediately adjacent to and exterior of the edge surface of the base 25. The light sensor 28 likewise communicates with the same location on the peripheral edge surface of the base 25 through the optical fiber 30 which has a light-receiving end portion embedded in the transparent plastic body of the LED 26 and protruding outwardly from the edge surface of the base 25 in the illuminating direction 32. Preferably, the location on the edge surface with which the light source and light sensor communicate is at a corner juncture of edge surface portions to create an outwardly-facing, generally convex edge surface area in the region surrounding such location to facilitate contact of the optical fiber with the optical codes over a wide range of manual approach angles.

The LED 26 has a pair of detachable electrical connectors 26a, and the phototransistor 28 has a pair of detachable electrical connectors 28a, extending in directions generally opposite to the illuminating direction 32 and substantially parallel to the aforementioned imaginary plane. These detachabled connectors are detachable slidable longitudinaly into mating female sockets 35, 37, respectively (FIG. 1), which are connected to the electrical circuitry of the optical code reader 10. By removal of the rear cover plate 14 of the optical code reader 10, it is possible simply to grasp the reader head 24 manually and slide the electrical connectors 26a, 28a out of the female sockets 35, 37 respectively, and to replace the reader head by the reverse process. The flexibility of the connectors 26a and 28a permit simultaneous insertion of the connectors 26a and 28a into their female sockets even though they do not extend in exactly the same direction. Such detachable connection is feasible so long as the flexible connectors 26a, 28a extend in a direction or directions which at least have vector components which extend in the same direction and opposite to the illuminating direction 32, (referred to herein as directions "generally opposite" to the illuminating direction 32).

The other features of the reader head are best understood in connection with the steps of its manufacture. The elongate optical fiber 30 is cut to a length in excess of that which will ultimately be present in the finished reader head of FIG. 5, and one end thereof is brought into proximity with a conventional soldering iron or other heat source so than an end portion 30a is shaped by heat deformation into a generally frustoconical shape having a cross section which increases gradually to the end. A small aperture 34, as shown in FIGS. 3 and 6, is formed in the base 25 by drilling or puncturing through a partition 36. The size of the aperture 34 is sufficient to accept the insertion of the optical fiber 30 except for the expanded end portion 30a. Accordingly, the fiber 30 is inserted through the aperture 34 from the side of the partition 36 facing the light sensor mounting depression 38, and drawn completely through the aperture until the expanded end portion 30a prevents further progress. Thereafter, the phototransistor 28 is inserted into the mounting depression 38, which automatically positions the phototransistor transversely relative to the aperture 34 due to the mating conformation of the depression to the shape of the phototransistor, and the phototransistor is pressed forcibly into abutment with the end portion 30a of the optical fiber. Deformable plastic tabs 40 are then pressed over the top of the phototransistor 28 by the application of mechanical force (for example, by squeezing with a pair of pliers), thereby fixedly connecting the phototransistor 28 to the base 25 and holding it is forcible abutment with the end portion 30a of the optical fiber 30. The junction between the end portion 30a of the fiber and the phototransistor 28 is completed by applying any conventional adhesive suitable for the purpose and permitting the adhesive to set. During the setting process, there is no danger of misalignment of the phototransistor 28 with respect to the optical fiber, or relief of the abutment pressure between them, since the deformable tabs 40 and aperture 34 hold these elements rigidly in place while the adhesive sets.

The LEd 26 is similarly automatically positioned relative to the base by a mating mounting depression 41 which properly aligns it both longitudinally (by groove 41a) and transversely. The LED is then fixedly connected to the base 25 by a deformable plastic tab 42 which is inserted between the connectors 26a, and grips them firmly when deformed by mechanical force. The LED 26 has a slit 44 cut to the center of its transparent body and a width sufficient to accept the insertion of the optical fiber 30. The fiber 30 is thus inserted into the slit 44 to the center of the plastic body as shown in FIG. 4 and the excess length of the fiber is pressed into one of the notches of a fiber-holding comb 46 which holds the fiber mechanically in proper position in the slit 44 while a suitable adhesive is applied to bond the fiber into the slit, and bond the LED 26 to the base 25, after which the adhesive is permitted to set. Thereafter, the excess portion of the fiber protruding outwardly from the LED 26 is cut off flush with the tip of the LED's plastic body, and the comb 46 is detached from the body 25 simply by breaking it off at the junction 46 shown in FIGS. 3 and 4. The tip of the plastic body of the LED 26, where the light receiving end of the optical fiber 30 emerges, is polished with jeweler's rouge, completing the manufacturing process and resulting in the finished reader head shown in FIG. 5.

It will be appreciated that the deformable mounting structures for the light sensor and light source, respectively, and the fiber holding features of the base 25, together with the heat-deformed, expanded end of the optical fiber 30, significantly facilitate the assembly of the reader head by making proper positioning of the elements virtually automatic and reducing the criticality of exact positioning and alignment. Alternative deformable mounting structures and fiber holding features are likewise intended to be within the scope of the invention. For example, the mounting depressions for the light source and/or light sensor could themselves be deformable, creating a force-fit which holds the light source or sensor in place.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A reader head for an optical code reader comprising:
   (a) a base having an elongate substantially endless edge surface defining a periphery of said base, said edge surface extending longitudinally along said periphery of said base in different directions defining a common plane;
   (b) light source means mounted on said base communicating optically with a location on said edge surface for directing light in an illuminating direction extending substantially parallel to said plane and outwardly from said edge surface so as to illuminate an area immediately adjacent to and exterior of said location on said edge surface;
   (c) light sensor means mounted on said base communicating optically with said location on said edge surface for receiving light reflected from said area, said light sensor means including an optical fiber at said location protruding outwardly from said edge surface generally in said illuminating direction; and
   (d) said light source means and said light sensor means having detachable electrical connectors, each of said electrical connectors extending in a direction having a vector component opposite to said illuminating direction and substantially parallel to said plane.

2. The reader head of claim 1 wherein said edge surface extends longitudinally from said location on said edge surface in respective different directions so as to form a corner at said location.

3. The reader head of claim 1 wherein said light source means protrudes outwardly from said edge surface substantially coextensively with said optical fiber.

4. A reader head for an optical code reader comprising:
   (a) a base;
   (b) a single elongate optical fiber mounted on said base, said optical fiber having a first end for receiving reflected light from optical codes and having a second end for transmitting said light;
   (c) light sensor means mounted on said base proximate said second end of said optical fiber for receiving the light transmitted by said second end; and
   (d) said optical fiber having an end portion, adjacent said second end, of frustoconical shape, having a cross-sectional area which increases gradually to said second end.

5. The reader head of claim 4 wherein said light sensor means and said second end of said optical fiber are in abutment with each other.

6. The reader head of claim 4 wherein said base includes means for mounting said first end of said optical fiber in position enabling said first end to contact said optical codes.

7. The reader head of claim 4 wherein said base includes means for holding said light sensor means in forcible abutment with said second end of said optical fiber.

8. A reader head for an optical code reader comprising:
   (a) a base;
   (b) an elongate optical fiber mounted on said base, said optical fiber having a first end for receiving reflected light from optical codes and having a second end for transmitting said light;
   (c) light sensor means, mounted on said base proximate said second end of said optical fiber, for receiving the light transmitted by said second end;
   (d) said optical fiber having an end portion, adjacent said second end, of varying cross-sectional area which increases gradually to said second end; and
   (e) fiber-holding means on said base for holding said second end of said optical fiber in proximity to said light sensor means, said fiber holding means including means defining an aperture of cross-sectional area sufficient to accept the insertion therethrough of said optical fiber throughout a majority of the length of said fiber, but insufficient to permit the passage therethrough of said second end of said optical fiber.

9. A reader head for an optical code reader comprising:
   (a) a base;
   (b) light source means mounted on said base for illuminating optical codes;
   (c) light sensor means mounted on said base for receiving light reflected from optical codes;
   (d) first deformable means on said base, said light source means being fixedly connected to said base adhesively and by deformation of said first deformable means;
   (e) second deformable means on said base, said light sensor means being fixedly connected to said base adhesively and by deformation of said second deformable means.

10. The reader head of claim 9, including means defining a pair of depressions on said base, each matingly conforming to the shape of a respective one of said light source means and light sensor means, for positioning said light source means and said light sensor means, respectively, on said base.

11. A reader head base for an optical code reader comprising:
   (a) an elongate substantially endless edge surface defining a periphery of said base, said edge surface extending longitudinally along said periphery of said base;
   (b) said base including means for mounting a light source on said base in a predetermined position communicating with a location on said edge surface; and
   (c) said base further including fiber-holding means for holding an optical fiber in a position protruding outwardly from said edge surface at said location, said fiber-holding means including a comb-shaped fiber-holding member detachably connected to the remainder of said base and protruding outwardly from said edge surface adjacent said location, said comb-shaped fiber-holding member having means defining at least one notch therein for frictionally accepting and holding said optical fiber.

12. The reader head base of claim 11, further including a breakable member detachably connecting said fiber-holding member to said base.

* * * * *

UNITED STATES PATENT AND TRADEMARK OFFICE
CERTIFICATE OF CORRECTION

PATENT NO. : 4,801,789

DATED : January 31, 1989

INVENTOR(S) : Paul R. Davis

It is certified that error appears in the above-identified patent and that said Letters Patent is hereby corrected as shown below:

Col. 4, line 48    Change "is" to --in--

Col. 4, line 59    Change "LEd" to --LED--

Col. 6, line 60    After "from" insert --said--

Signed and Sealed this

Twenty-sixth Day of June, 1990

Attest:

HARRY F. MANBECK, JR.

Attesting Officer    Commissioner of Patents and Trademarks